United States Patent [19]
Yoshinobu et al.

[11] Patent Number: 5,808,702
[45] Date of Patent: Sep. 15, 1998

[54] TELEVISION SYSTEM

[75] Inventors: Hitoshi Yoshinobu, Kanagawa; Junya Saito, Saitama; Kazuhiro Akaike, Tokyo, all of Japan

[73] Assignee: Sony Corporation, Tokyo, Japan

[21] Appl. No.: 774,894

[22] Filed: Dec. 27, 1996

Related U.S. Application Data

[63] Continuation of Ser. No. 306,675, Sep. 15, 1994.

[30] Foreign Application Priority Data

Sep. 22, 1993 [JP] Japan .................................. 5-236563

[51] Int. Cl.⁶ .............................. H04N 5/50; H04N 5/262
[52] U.S. Cl. ......................... 348/731; 348/732; 348/555; 348/706
[58] Field of Search .................................. 348/725, 731, 348/732, 734, 705, 706, 722, 721, 571, 553–557; H04N 5/268, 5/775

[56] References Cited

U.S. PATENT DOCUMENTS

| | | | |
|---|---|---|---|
| 4,267,563 | 5/1981 | Sato et al. . | |
| 4,488,179 | 12/1984 | Kruger et al. | 348/706 |
| 4,581,645 | 4/1986 | Beyers, Jr. | 348/705 |
| 4,647,973 | 3/1987 | Deiss | 348/705 |
| 4,841,368 | 6/1989 | Rumbolt et al. . | |
| 4,996,597 | 2/1991 | Duffield | 348/731 |
| 5,103,314 | 4/1992 | Keenan | 348/732 |
| 5,257,106 | 10/1993 | Maruok | 348/731 |
| 5,461,427 | 10/1995 | Duffield et al. | 348/732 |

FOREIGN PATENT DOCUMENTS

| | | |
|---|---|---|
| 0 368 220 A2 | 5/1990 | European Pat. Off. ....... H04N 5/445 |
| 0 368 220 B1 | 5/1990 | European Pat. Off. ....... H04N 5/445 |
| 0 371 749 | 6/1990 | European Pat. Off. ......... H04N 5/76 |
| 0 536 901 A2 | 4/1993 | European Pat. Off. ....... H04N 5/445 |
| 0 546 858 A2 | 6/1993 | European Pat. Off. ......... H04N 5/45 |
| 2 521 800 | 8/1983 | France .............................. H03J 9/02 |
| 31 51 492 A1 | 7/1983 | Germany .......................... H04N 7/10 |
| 2 116 761 | 9/1983 | United Kingdom .............. H03J 9/00 |
| 2 247 375 | 2/1992 | United Kingdom ............. H04N 5/14 |

OTHER PUBLICATIONS

European Search Report—Application No. EP 94 30 6894, dated Jun. 27, 1995.

*Primary Examiner*—Michael Lee
*Attorney, Agent, or Firm*—Limbach & Limbach L.L.P.

[57] ABSTRACT

There is provided a television system wherein a plurality of VTRs are connected to a television set so that they are capable of the recording, display and the like of a channel which is not incorporated in a given VTR using one of tuners in the other VTRs and a or the television set. A table listing the tuners and channels incorporated in the television set and VTRs connected thereto is created, and the switching, recording and display of a channel of the television set is performed based on the table. By mapping channels which can be actually used, the usable channels can be quickly selected and picked up.

15 Claims, 9 Drawing Sheets

FIG.7

TUNER INFORMATION TABLE 28

| TV | VTR1 | VTR2 | VTR3 | VTR4 |
|---|---|---|---|---|
| VHF1 1 | VHF1 1 | VHF1 1 | VHF1 1 | |
| VHF2 0 | VHF2 0 | VHF2 0 | VHF2 0 | |
| VHF3 1 | VHF3 1 | VHF3 1 | VHF3 1 | |
| VHF4 1 | VHF4 1 | VHF4 1 | VHF4 1 | |
| UHF61 0 | UHF61 0 | UHF61 0 | UHF61 0 | |
| UHF62 0 | UHF62 0 | UHF62 0 | UHF62 0 | |
| UHF63 0 | UHF63 0 | UHF63 0 | UHF63 0 | |
| | BS1 1 | | | |
| | BS2 0 | | | |
| | BS3 1 | | | |
| | BS4 0 | | | |
| | BS5 1 | | | |
| | BS6 0 | | | |
| | BS7 1 | | | |
| | | CS1 1 | | |
| | | CS2 1 | | |
| | | CS3 1 | | |
| | | CS4 1 | | |

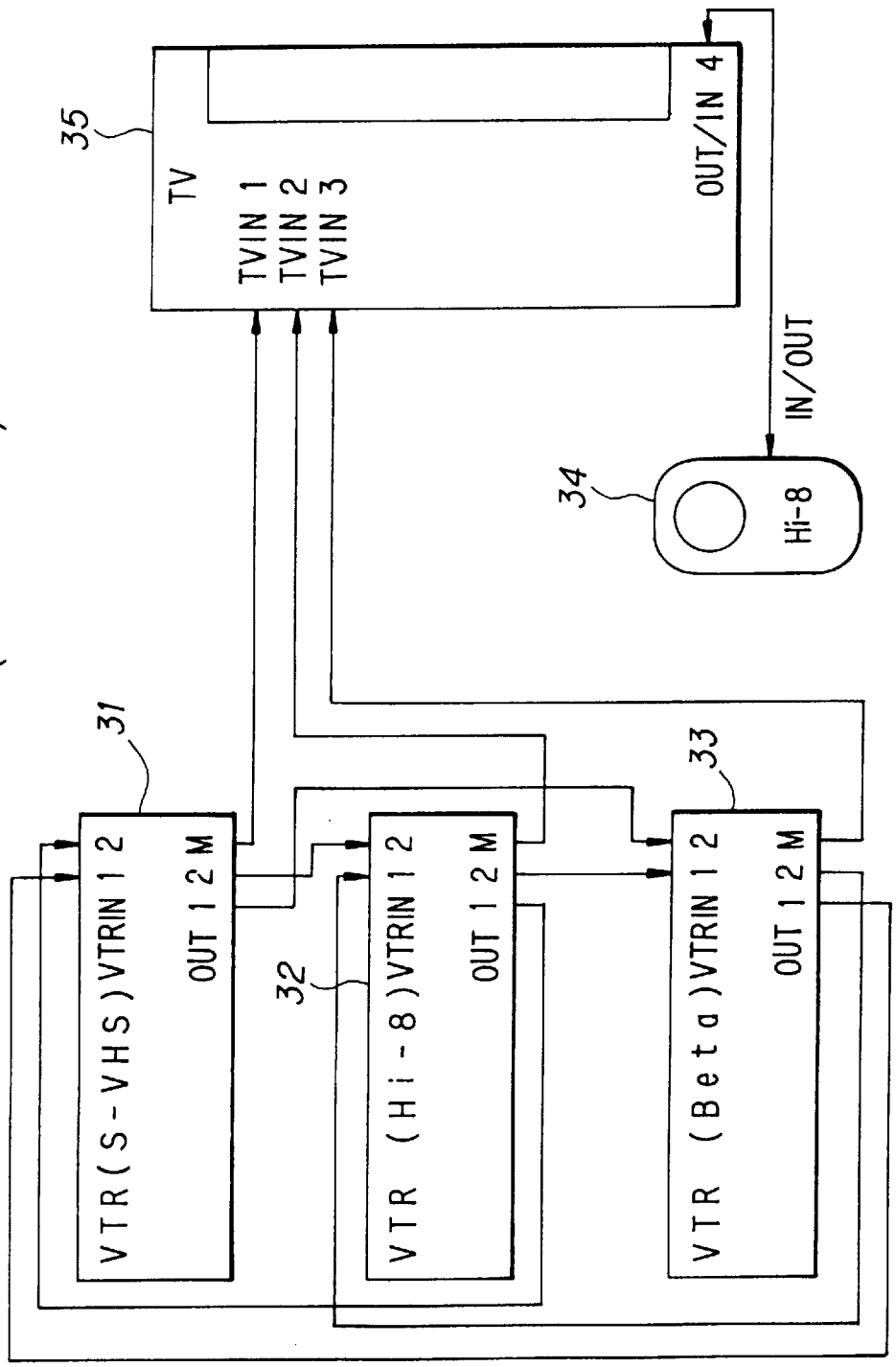

TELEVISION SYSTEM

This is a continuation of co-pending application Ser. No. 08/306,675 filed on Sep. 15, 1994.

BACKGROUND OF THE INVENTION

1. Field of the Invention

The present invention relates to a television system (shared tuner system) comprised of one television set and one or more apparatuses such as a VTR connected thereto wherein a tuner incorporated in the television set or one of the apparatuses is shared by all the apparatuses in the system to allow an apparatus which does not have a tuner adapted to a desired channel to perform recording on the channel and to allow an apparatus having no tuner to perform recording.

2. Description of the Related Art

Conventional VTRs incorporate a tuner for timed recording (recording at a preset time), and such a tuner is generally remotely controlled using a remote controller in accordance with steps for timed recording defined for each type of VTR.

It has recently become popular in more and more homes to use a VTR incorporating a tuner capable of recording a satellite broadcast and a VTR which does not have such a tuner by connecting them to a single television set.

FIG. 11 shows a conventional recording/reproducing system having a configuration wherein three stationary VTRs 31, 32 and 33 and a VTR 34 with a camera are connected to a television set 35.

The stationary VTRs 31, 32 and 33 have input terminals VTRIN1 and VTRIN2, output terminals OUT1 and OUT2 and a monitor terminal M.

The input and output terminals of each stationary VTR are respectively connected to the output and input terminals of the remaining two stationary VTRs in a one-to-one relationship. In FIG. 11, cables for picture signals, right audio signals and left audio signals are represented by a single solid line. Hereinafter, those cables are collectively referred to as video cables.

The above-described connection of the stationary VTRs 31, 32 and 33 allows pictures or the like from one VTR to be transmitted to other VTRs for recording etc.

For example, if the VTR 31 incorporates a tuner for a broadcast satellite channel and the VTR 32 does not incorporate the same, pictures over the BS channel can be recorded into the VTR 32 through the VTR 31 by performing a series of operations, i.e., the operations of turning on the power supply of the VTR 31, switching the output of the VTR 31 to the VTR 32, switching the tuner of the VTR 31, turning on the power supply of the VTR 32, switching the input of the VTR 32 to the VTR 31 and starting recording at the VTR 32.

The monitor terminals M of the stationary VTRs 31, 32 and 33 are connected to separate input terminals of the television set 35 by the video cables. Such connections allow pictures from the VTRs 31, 32 and 33 to be displayed on the television set 35.

For example, to display a picture from the VTR 31 on the television set 35, the input of the television set 35 must be switched to the input terminal IN1 for the VTR 31 by operating the remote controller or switches on the television set 35.

The VTR 34 with a camera is frequently attached to and detached from the television set 35. It is therefore connected to an exclusive terminal provided on a front face or a side of the television set 35. Although this connection is switchable between input and output positions, in most cases, it is used to reproduce the contents recorded in the VTR 34 on the television set 35. In general, the VTR 34 with a camera does not incorporate a tuner.

However, the above-described conventional system comprised of a plurality of VTRs and a television set has problems as described below.

(1) The tuners incorporated in the stationary VTRs 31, 32 and 33 hinder the cost reduction of the VTRs.

(2) The assignment of channels to buttons on remote controllers may vary depending on VTRs. Especially, in a region where recording is performed mostly on UHF broadcasts, problems such as confusion during channel switching and recording or timed recording of an undesired program can easily occur.

(3) To allow a VTR incorporating a tuner (for receiving broadcasts) from a broadcast satellite or communication satellite to transmit picture signals to a VTR which does not incorporate such a tuner, those VTRs must be directly connected through the video cables. The wiring for this purpose becomes quite complicated (analogous to a spider web) the greater the number of the VTRs. This has increased the time required for the wiring and the possibility of errors in wiring.

(4) In order to send pictures from a VTR incorporating a tuner capable of receiving broadcasts from a broadcast satellite or communication satellite to a VTR which does not incorporate such a tuner for recording by the latter or in order to send such pictures to a television set for displaying them, the user must memorize the relationships between the television set and the VTRs and between the VTRs. This increases the possibility of operational errors and increases the time required for operations. This is because remote controllers for the apparatuses at both of the transmitting and receiving ends or various operation buttons on those apparatuses must be operated in accordance with the complicated steps as described in the above example.

(5) When the system is remote-controlled, operations must be performed using a plurality of remote controllers within the user's reach. This may put the living space of the user in disorder.

(6) Since the VTR integral with a camera does not incorporate a tuner, it is not used for recording in homes. This results in in a waste of space.

Therefore, there are several problems to be solved. A user should be able to perform quick and correct operations without a need for incorporating tuners in the VTRs. Wiring should be simplified and operations should be able to be performed using only one remote controller. A VTR having no tuner, such as a VTR integral with a camera, should be able to perform recording. It should be possible to transmit picture signals from the television set or a VTR incorporating a tuner adapted to a channel to be recorded to a VTR which does not incorporate such a tuner for recording at the latter.

SUMMARY OF THE INVENTION

According to a first aspect of the present invention, there is provided a television system comprising at least one video apparatus and a television set wherein the at least one video apparatus operates according to predetermined control signals transmitted by the television set to which it is connected and wherein the television set includes an internal tuner, a picture signal processing portion, a channel selection means for selecting a channel, a selection means for selecting any one of the internal tuner and tuners incorporated in the video apparatuses connected thereto as a tuner to receive the channel selected by the channel selection means, and a supply means for supplying the output of the selected tuner to the picture signal processing means and/or the video apparatuses connected thereto.

According to a second aspect of the present invention, there is provided the television system according to the first aspect, wherein the television set further includes a storage means for storing effective channels of the internal tuner and effective channels of the tuners incorporated in the video apparatuses connected thereto, the channel selection being performed according to the information on the effective channels stored in the storage means.

According to a third aspect of the present invention, there is provided the television system according to the first aspect, wherein the television set further includes a means for determining the effective and ineffective channels of the tuners incorporated in the video apparatuses connected thereto and a means for registering the effective channels of the internal tuner and the effective channels of the tuners incorporated in the video apparatuses connected thereto in the storage means.

According to a fourth aspect of the present invention, there is provided the television system according to the second aspect, wherein the channel selection is performed based on a screen display of the information of the effective channels.

According to a fifth aspect of the present invention, there is provided the television system according to the first aspect, wherein the channel selection is performed through remote control.

According to a sixth aspect of the present invention, there is provided the television system according to the first aspect, wherein the selection means gives priority to the internal tuner in selecting a tuner.

According to a seventh aspect of the present invention, there is provided the television system according to the first aspect, wherein if the internal tuner is unable to receive the selected channel, the television set activates one of the video apparatuses connected thereto which has a tuner capable of receiving the selected channel to receive the selected channel through the activated video apparatus.

According to an eighth aspect of the present invention, there is provided the television system according to the first aspect, wherein at least one of the video apparatuses connected is a VTR which records the selected channel.

According to a ninth aspect of the present invention, there is provided the television system according to the eighth aspect, wherein if the VTR does not have a tuner capable of receiving the selected channel, the supply means connects the output of any one of the video apparatuses which has a tuner capable of receiving the selected channel to the input of the VTR.

According to a tenth aspect of the present invention, there is provided the television system according to the eighth aspect, wherein the recording is performed at a time preset using a timer.

According to an eleventh aspect of the present invention, there is provided a television set which can be connected to at least one video apparatus comprising an internal tuner, a picture signal processing portion, a channel selection means for selecting a channel, a selection means for selecting any one of the internal tuner and tuners incorporated in the video apparatuses connected thereto as a tuner to receive the channel selected by the channel selection means and a supply means for supplying the output of the selected tuner to the picture signal processing means and/or the video apparatuses connected thereto.

According to a twelfth aspect of the present invention, there is provided the television set according to the eleventh aspect further comprising a storage means for storing effective channels of the internal tuner and effective channels of the tuners incorporated in the video apparatuses connected thereto, the channel selection being performed according to the information on the effective channels stored in the storage means.

According to a thirteenth aspect of the present invention, there is provided the television set according to the eleventh aspect further comprising a means for determining the effective and ineffective channels of the tuners incorporated in the video apparatuses connected thereto and a means for registering the effective channels of the internal tuner and the effective channels of the tuners incorporated in the video apparatuses connected thereto in the storage means.

According to a fourteenth aspect of the present invention, there is provided the television set according to the twelfth aspect, wherein the channel selection is performed based on a screen display of the information of the effective channels.

According to a fifteenth aspect of the present invention, there is provided the television set according to the eleventh aspect, wherein the channel selection is performed through remote control.

According to a sixteenth aspect of the present invention, there is provided the television set according to the eleventh aspect, wherein the selection means gives priority to the internal tuner in selecting a tuner.

According to a seventeenth aspect of the present invention, there is provided the television set according to the eleventh aspect, wherein if the internal tuner is unable to receive the selected channel, the television set activates any one of the video apparatuses connected thereto which has a tuner capable of receiving the selected channel to receive the selected channel through the activated video apparatus.

According to an eighteenth aspect of the present invention, there is provided the television set according to the eleventh aspect, wherein at least one of the video apparatuses connected is a VTR to which signals over the selected channel are transmitted.

According to a nineteenth aspect of the present invention, there is provided the television set according to the eighteenth aspect, wherein if the VTR does not have a tuner capable of receiving the selected channel, the supply means connects the output of any one of the video apparatuses which has a tuner capable of receiving the selected channel to the input of the VTR.

Television systems having the configurations as described above will provide the following advantages.

(1) There is provided a television system including one or a plurality of VTRs connected to a television set in a predetermined manner wherein a tuner incorporated in an apparatus in the system is selected to perform channel selection in the system. This makes it possible to easily perform recording and the like by selecting a desired tuner using an apparatus, e.g., a VTR, which does not incorporate a tuner.

(2) Tuner selection is performed using a tuner information table. With the tuner information table stored in the television set, it is possible to easily switch television pictures and voices to a channel which is not incorporated in the television set by, for example, connecting a video apparatus incorporating a tuner adapted to the desired channel based on the tuner information table.

(3) The tuner information table is created by performing mapping between the tuners incorporated in the apparatuses in the television system and the information on the channel the tuners can receive. This makes it possible to have a systematic understanding of the existing tuners and the channels which can be received.

(4) In this television system, channel selection is performed using a channel selection screen which is created based on the tuner information table. As a result, information required for channel selection can be obtained through operations performed while monitoring the screen. This simplifies the operational steps.

(5) By giving priority to the tuner incorporated in the television set from among apparatuses in the television system in selecting a tuner, the channels covered by the television set is given priority. This makes it possible to minimize deviation during channel setting (deviation of the frequency from the position at which a channel is set).

(6) If television set does not have a desired channel, the desired channel is selected through a tuner having the desired channel. As a result, a channel which is not covered by each individual VTR or the like belonging to the system can be used as a channel of each VTR.

(7) A selected channel is recorded by a predetermined VTR in the television system. If the predetermined VTR does not have a tuner capable of selecting the desired channel, recording is performed by connecting the VTR to an apparatus in the television system which has a tuner capable of selecting the desired channel. This makes it possible to record a broadcast channel even into a predetermined video apparatus which does not incorporate a tuner adapted to the channel by connecting it to the television set or a video apparatus which has such a tuner based on the tuner information table and by sending pictures and voices from the tuner to the video apparatus without such a tuner.

(8) With the capability of timed recording, some predetermined operations will allow even an apparatus which does not have the desired channel to perform recording at a preset time through an apparatus having the desired channel.

(9) Since the channel selecting operation is performed through remote control, what is needed is only to specify a channel and an apparatus to record the channel.

BRIEF DESCRIPTION OF THE DRAWINGS

FIG. 7 illustrates the tuner information table in the same embodiment.

FIG. 11 illustrates a prior art system.

DETAILED DESCRIPTION OF THE PREFERRED EMBODIMENT

An embodiment of a television system according to the present invention will now be described with reference to the accompanying drawings.

Figure 1:
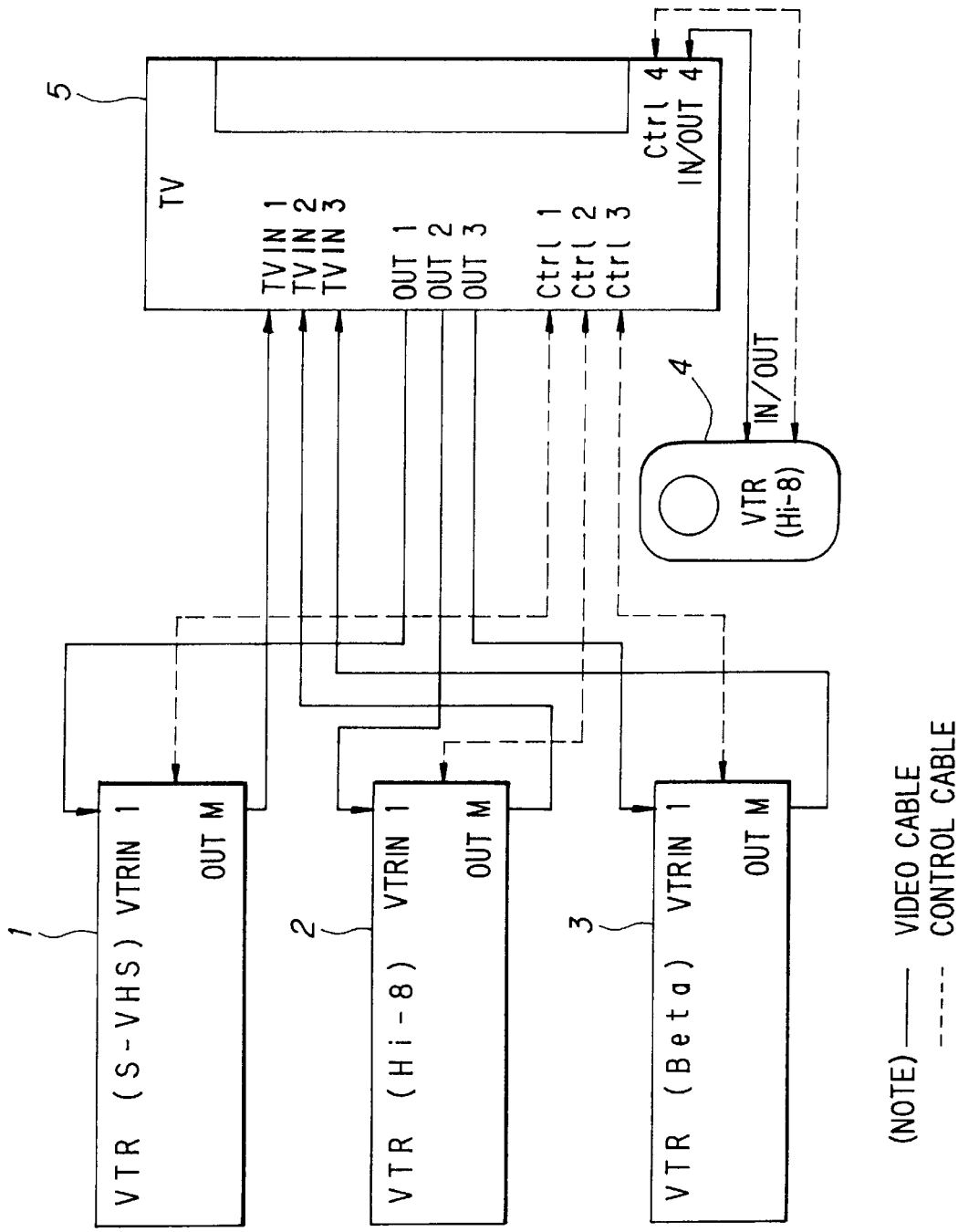
FIG. 1 is a block diagram showing a configuration of an embodiment of a television system according to the present invention.

FIG. 1 shows a configuration of an embodiment of a television system according to the present invention.

In the present embodiment, three stationary VTRs, i.e., an S-VHS type VTR 1, a Hi-8 type VTR 2 and a Beta type VTR 3, and one portable VTR, i.e., a VTR 4 integral with a camera, are connected to one television set (TV) 5.

Among the connection lines between the VTRs 1, 2, 3 and 4 and the TV 5, the solid lines represent video cables over which picture signals and audio signals are transmitted and the dotted lines represent control cables over which control signals are transmitted.

A first feature of this system is that the VTRs 1, 2, 3 and 4 are not directly connected to one another while the VTRs 1 through 4 are all connected to the TV 5 and that, therefore, the concept of input/output switching as in the prior art is not applicable to the VTRs 1, 2, 3 and 4. Interconnection between those VTRs is made through an AV selector function block 6 of the TV 5 which will be described later.

A second feature of this system is that the TV 5 has not only input terminals TVIN1, TVIN2, and TVIN3 but also output terminals OUT1, OUT2, and OUT3 which are connected to input terminals of the VTRs 1, 2 and 3 in a one-to-one relationship using the video cables. Specifically, the TV 5 has both input and output functions, i.e., it receives the input of pictures and voices from the VTRs 1, 2, 3 and 4 and outputs pictures and voices to the VTRs 1, 2, 3 and 4.

An input/output terminal IN/OUT4 of the TV 5 for the VTR 4 integral with a camera is used for both input and output.

A third feature of this system is that the TV 5 is connected to each of the VTRs 1, 2, 3 and 4 via the control cables. The TV 5 can check the state of all of the VTRs 1, 2, 3 and 4 and control the operations thereof by transmitting commands to the VTRs 1, 2, 3 and 4 which have been encoded based on the specifications of the respective VTRs through the control cables.

According to the commands transmitted by the TV 5 through the control cables, the VTRs 1, 2, 3 and 4 perform various operations such as starting and stopping recording, starting and stopping the transmission of pictures and voices to other apparatuses, and turning the power supplies on and off.

Figure 2:
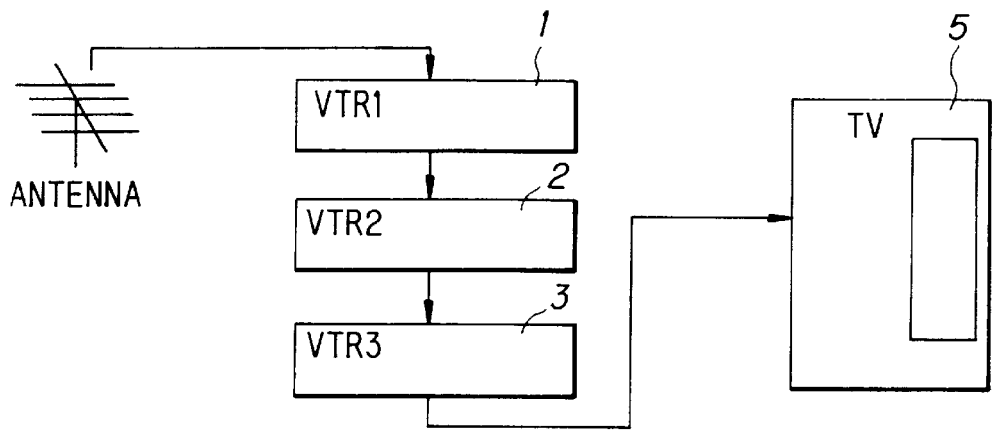
FIG. 2 is a block diagram showing one method for the connection of an antenna in the system.
Figure 3:
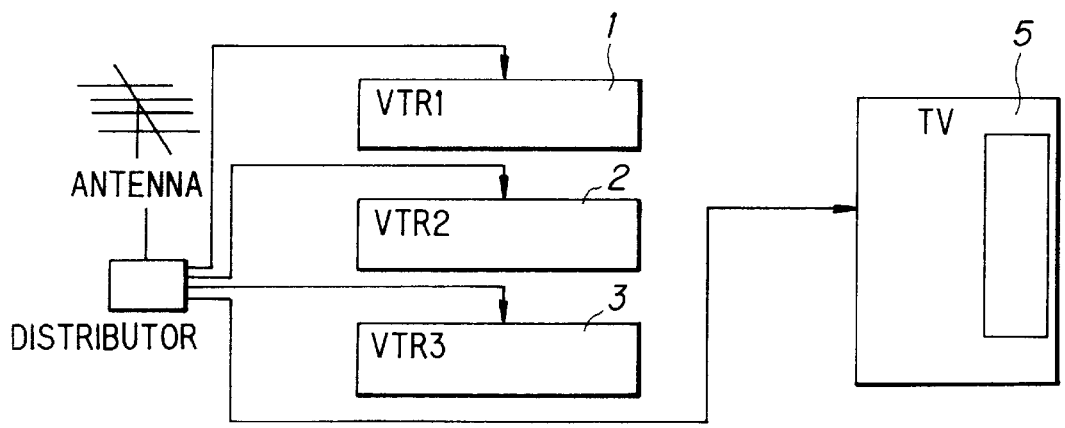
FIG. 3 is a block diagram showing another method for the connection of an antenna in the system.
Figure 4:
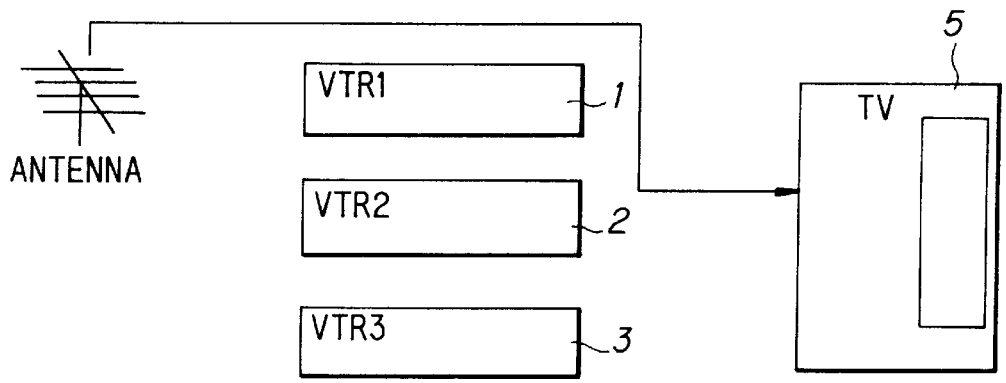
FIG. 4 is a block diagram showing still another method for the connection of an antenna in the system.

A variety of conventional methods are available for the connection of an antenna to the TV 5 and the VTRs 1, 2 and 3. The connection may be made using any of a skewered type shown in FIG. 3, a distributed type shown in FIG. 2 and a composite type shown in FIG. 4. FIG. 2, FIG. 3 and FIG. 4 show only the state of connection made to the antenna, the connection between the VTRs 1, 2 and 3 and the TV 5 being the same as that shown in FIG. 1.

The configuration of the TV 5 will now be described in detail.

Figure 5:
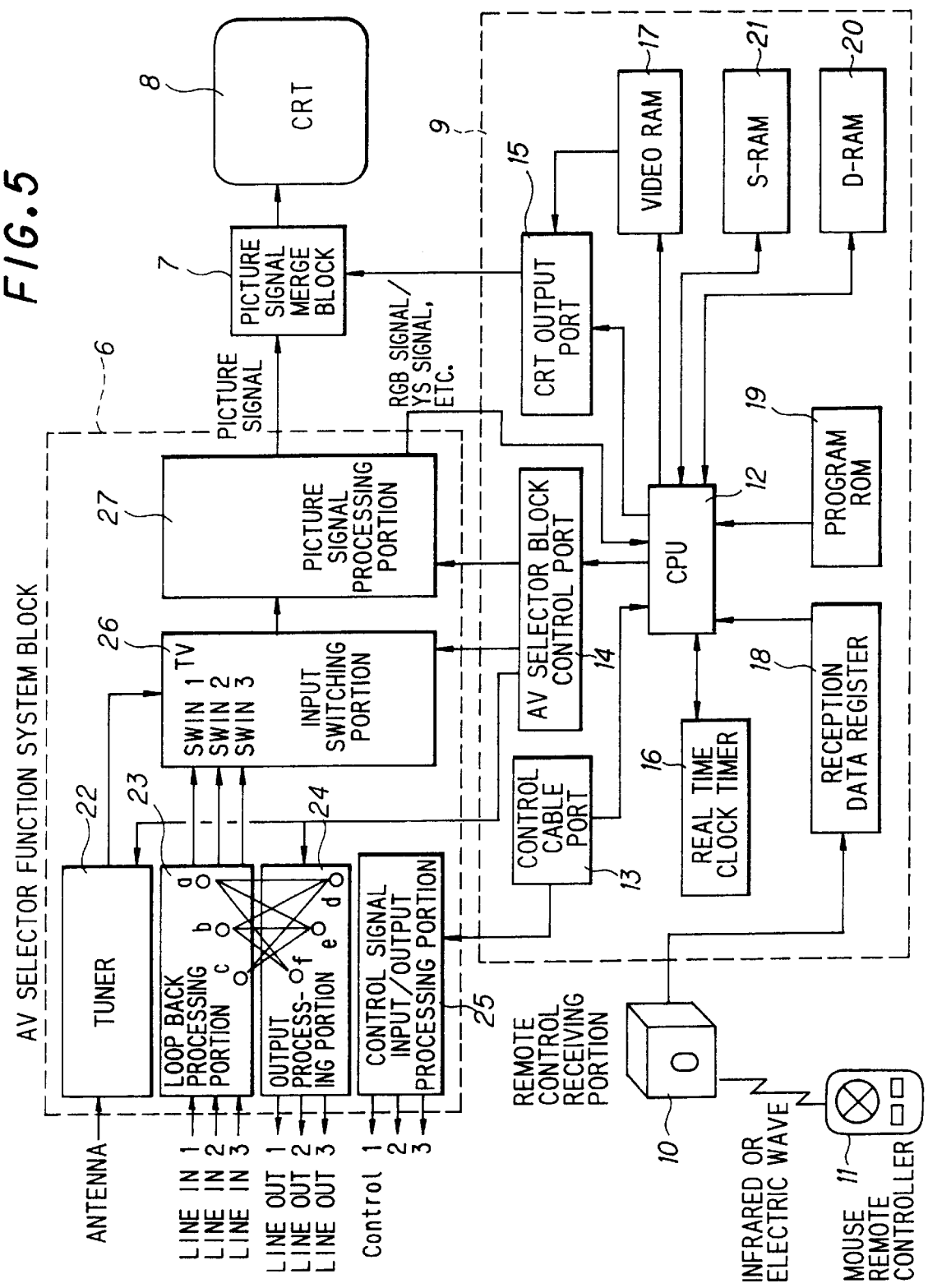
FIG. 5 is a block diagram showing a configuration of a television set in the system.

As shown in FIG. 5, the TV 5 is comprised of an AV selector function system block 6, a picture signal merge block 7, a CRT 8, a control portion 9, a remote control receiving portion 10 and a mouse remote controller 11.

The AV selector function system block 6, along with the control portion 9, forms an important part of the present invention. It is connected to the antenna and to the VTRs 1, 2, 3 and 4 via the video cables and the control cables and has a function of switching connections between the VTRs 1, 2, 3 and 4 and the CRT 8 and between the VTRs 1, 2, 3 and 4 under the control of the control portion 9.

The picture signal merge block 7 merges picture signals from the AV selector function system block 6 and video signals associated with an operational interface transmitted by the control portion 9 and supplies the results to the CRT 8.

This operational interface is the display of a menu or the like overlapping a normal picture on a screen which allows the user to perform various operations by pointing a cursor at buttons in the menu.

The CRT 8 displays images of normal pictures output by the picture signal merge block 7 with a menu or the like overlapping thereon on the screen thereof through well-known television display operations.

The control portion 9 receives remote control signals from the mouse remote controller 11 through the remote control receiving portion 10 and controls the AV selector function system block 6, picture signal merge block 7 and CRT 8 based on those signals.

The control portion 9 is constituted by a CPU 12, a control cable port 13, an AV selector block control port 14, a CRT output port 15, a real time clock timer 16, a video RAM 17, a reception data register 18, a program ROM 19, a DRAM 20 and an SRAM 21.

These circuits 12 through 21 have the functions as described below.

The CPU 12 is connected to all of the other circuits 13 through 21 and controls the operation of the system as a whole by reading and executing programs and various fixed data stored in the program ROM 19.

The control cable port 13 transmits commands output by the CPU 12 to the AV selector function system block 6.

The AV selector block control port 14 transmits control signals for input switching which are output by the CPU 12 to the AV selector function system block 6.

The CRT output port 15 is connected to the video RAM 17 and transmits display data of an operational interface created in the video RAM 17 to the picture signal merge block 7 under the control of the CPU 12.

The real time clock timer 16 measures the real time and is used by the CPU 12 for timed recording and the like.

The video RAM 17 stores video data of an operational interface displayed on the CRT 8. Such video data are merged at the picture signal merge block 7 with normal picture signals from the AV selector function system block 6.

The reception data register 18 temporarily stores signals output by the remote control receiving portion 10 and outputs them to the CPU 12.

The program ROM 19 stores various programs and fixed data for operating the VTRs and provides them to the CPU 12.

The DRAM 20 is a dynamic RAM for temporarily storing various data.

The SRAM 21 is a static RAM for storing a tuner information table to be described later and the like.

The configuration of the AV selector function system block 6 will now be described in detail.

The AV selector function system block 6 is constituted by a tuner portion 22, a loop back processing portion 23, an output processing portion 24, a control signal input/output processing portion 25, an input switching portion 26 and a picture signal processing portion 27.

The tuner portion 22 incorporates a tuner and supplies the output signals of the tuner to the input switching portion 26 according to control signals from the AV selector block control port 14 of the control portion 9.

The loop back processing portion 23 has a function of outputting picture and voice signals input from the VTRs 1, 2 and 3 to the input terminals IN 1, IN2 and IN 3 via the video cables to either the output processing portion 24 or input switching portion 26 according to a control signal from the AV selector block control port 14.

The output processing portion 24 selects VTRs 1. 2 and 3 to be connected to the output terminals OUT1, OUT2 and OUT3 of the TV 5 according to control signals from the AV selector block control port 14.

Terminals a, b and c of the loop back processing portion 23 and terminals d, e and f of the output processing portion 24 are arbitrarily connected in a one-to-one relationship as indicated by the arrows according to control signals from the AV selector block control port 14.

Specifically, by connecting one of the terminals a, b and c of the loop back processing portion 23 to one of the terminals d, e and f of the output processing portion 24, picture and voice signals from one of the VTRs can be transmitted to another VTR.

For example, if the terminal b of the loop back processing portion 23 and the terminal d of the output processing portion 24 are connected to each other according to a control signal form the AV selector block control port 14, picture and voice signals from the VTR 2 are transferred to the VTR 3.

The control signal input/output processing portion 25 receives the input of control signals from the control cable port 13 of the control portion 9 and outputs them to the VTRs 1, 2 and 3 via the control cables.

The input switching portion 26 selects an input specified by a control signal from the AV selector block control port 14 from among inputs from the tuner portion 22 and VTRs 1, 2, 3 and 4 and outputs it to the picture signal processing portion 27.

The picture signal processing portion 27 processes the picture signal and outputs the result to the CRT 8.

The operation of a television system having such a configuration will be described, the description being focused on items (1) creation of the tuner information table, (2) channel switching operation and (3) normal recording and recording of a program on a different channel.

1. Creation of the Tuner Information Table

The tuner information table is created by the control portion 9 by recording information on the tuners incorporated in the TV 5 and all the VTRs as a table in the SRAM 21 and is managed by the control portion 9.

Figure 6:
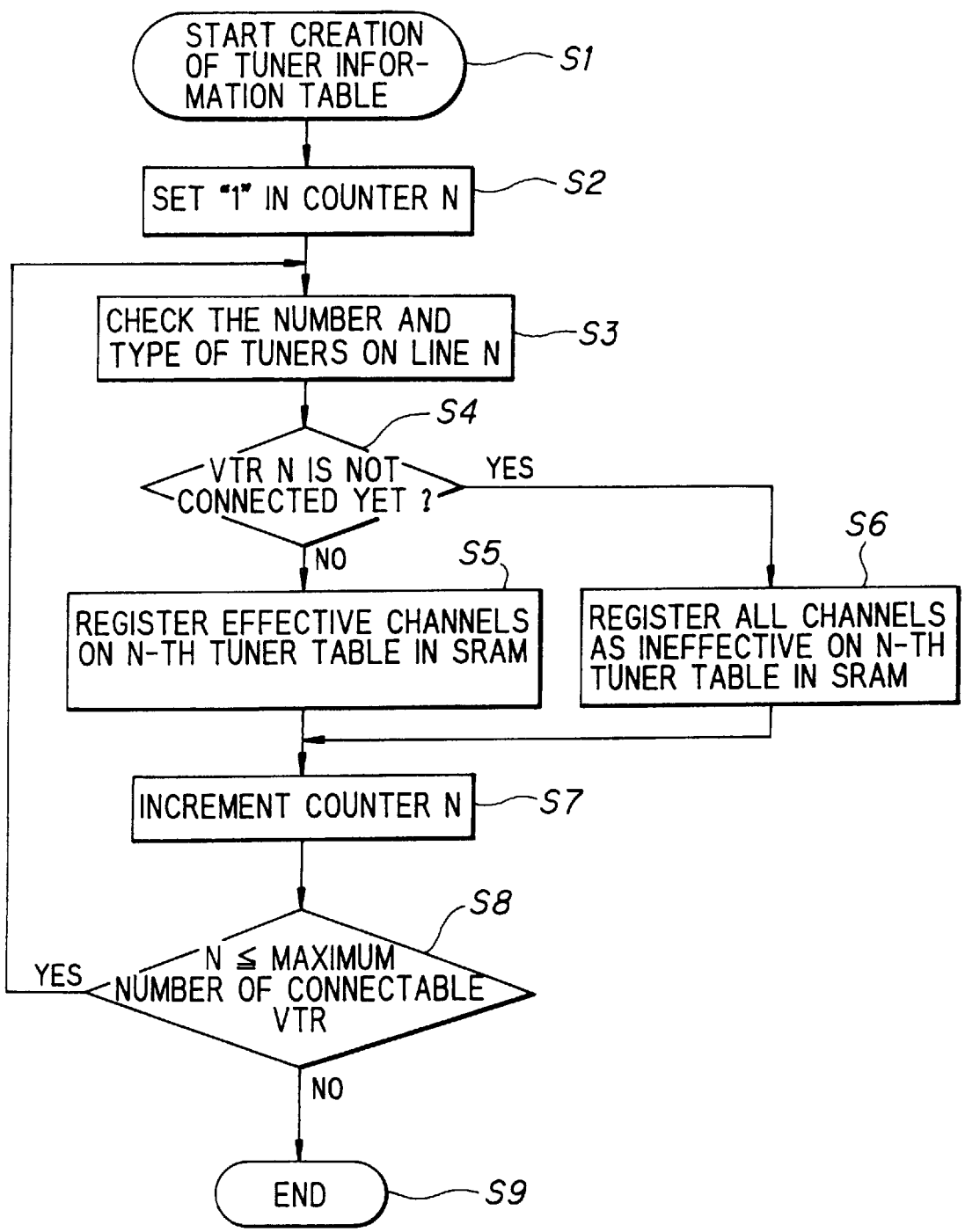
FIG. 6 is a flow chart illustrating a program for creating a tuner information table in the same embodiment.

Specifically, when the user performs the operation of setting the status of the VTRs of the TV 5, tuning the power supply on, or displaying a menu using the mouse remote controller 11, the CPU 12 activates a program for creating tuner information as illustrated by the flow chart in FIG. 6 (S1). First, the CPU 12 uses the DRAM 20 as a counter and sets a count value N therein at 1 (S2).

Next, the number, type and effective channels of tuners incorporated in the VTR 1 connected to LINE 1 of the TV 5 are examined (S3). For example, such an examination can be carried out using LANC which is one of control protocols for VTRs, wherein the VTR 1 is first activated by an activation command from the CPU 12. The tuners in the VTR 1 are switched to a channel by switching command and checked to determine whether pictures sent over the video cables are sandstorm-like pictures or not. In this way, it can be determined whether the channel is an effective channel or not. This process repeated for all the channels (VHF, UHF, BS, CS, CATV, etc.). Specifically, the picture signal processing portion 27 of the CPU 12 judges a channel to be effective if there is a horizontal or vertical synchronization signal and judges the channel to be a sandstorm-like picture, i.e., an ineffective channel, if there is no horizontal signal (S3).

Next, the CPU 12 checks whether the VTR 1 has not been connected to LINE 1 yet or the VTR 1 has no tuner based on a judgement that all the channels are ineffective (S4). If there is an effective channel, the CPU 12 registers the effective channel in a first tuner table in the SRAM 21 (S5). On the other hand, if all the channels are ineffective, it registers all of the ineffective channels in the first tuner table in the SRAM based on a judgement that the VTR 1 has not been connected to LINE 1 or the VTR 1 has no tuner (S6).

The CPU 12 then increments the count value in the DRAM 20 by 1 (S7).

Next, the CPU 12 judges whether the count value in the DRAM is equal to or smaller than the number of connectable VTRs, i.e., the number of the lines (S8). If the count value is greater than the number of connectable VTRs, the process proceeds to step S9 and, if the count value is equal to or smaller than the number of connectable VTRs, a tuner information program for the VTR connected to the next line is executed.

This operation is repeated in the number of connectable VTRs, and an effective and ineffective channels are registered during each cycle of operation. If no VTR is connected or the connected VTR has no tuner, all channels are registered as ineffective in the corresponding tuner table.

Then, tuner information for all connectable connection lines is mapped and registered in the SRAM 21 to terminate the series of table creating operations (S9).

According to such a tuner information creating program, a mapped tuner information table 28 is created in the SRAM 21 as shown in FIG. 7.

For example, ground waves VHF2, VHF3 and VHF4 are effective channels for the television set and can be utilized by the VTRs. Effective channels for the VTR 1 are ground waves VHF1, VHF3, and VHF4 and BS1, BS3, BS5 and BS7. Effective channels for the VTR 2 are ground waves VHF1, VHF3, and VHF4 and CS1, CS2, CS3 and CS4. Effective channels for the VTR 3 are ground waves VHF1, VHF3, and VHF4.

2. Channel Switching Operation

Figure 8:
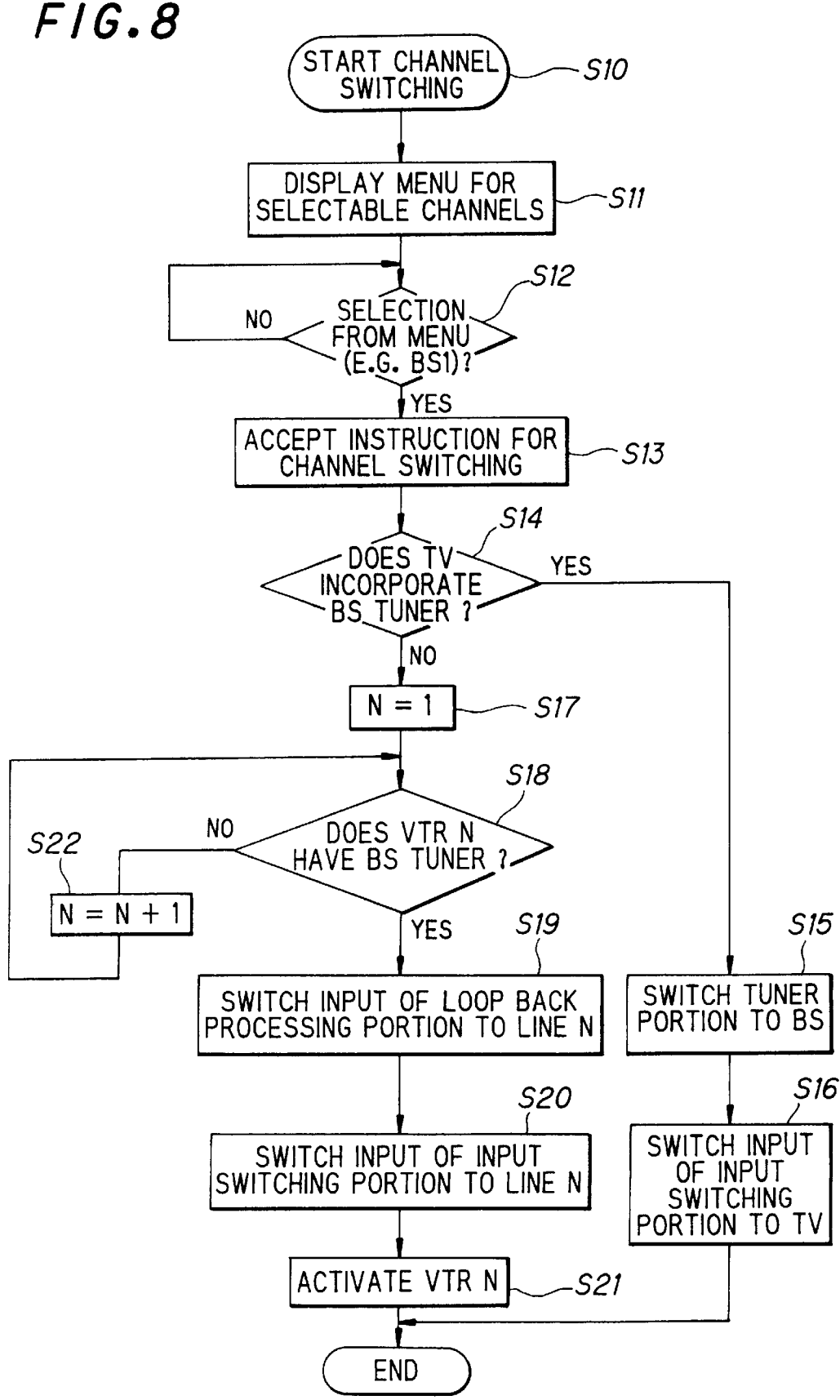
FIG. 8 is a flow chart illustrating a channel switching program in the same embodiment.

To start the channel switching operation, the user specifies "channel switching" in a menu displayed on the screen of the CRT using the remote controller 11 to cause the CPU 12 to activate a channel switching program as shown in FIG. 8 (S10).

Figure 9:
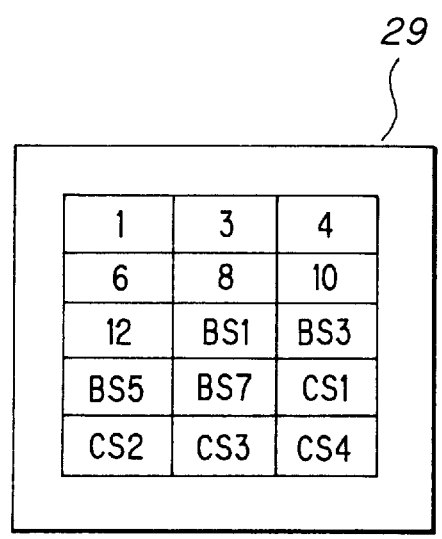
FIG. 9 illustrates a menu display in the same embodiment.

First, the CPU 12 looks up the tuner information table in the SRAM 21 to display only selectable channels in the form of a matrix as a menu represented by buttons as shown in FIG. 9 on the CRT 8 (S11). Next, the CPU 12 stands by for an input of menu selection (S12). Then, the CPU 12 is caused to accept an instruction for channel selection (BS1 in the example shown in FIG. 8) through an operation on the remote controller 11 by the user (S13). At this time, the CPU 12 accepts only selectable channels and ignores the selection instruction for any channel other than the selectable ones.

Next, the CPU 12 judges whether the TV 5 incorporates a tuner adapted to the selected channel or not (S14) and, if yes, the CPU 12 switches the tuner portion 22 to a tuner adapted to the channel (BS in the case shown in FIG. 8) and causes it to receive the selected channel (S15). The CPU 12 further controls the switching portion 26 to set the input thereof to the tuner portion 22 (S16). Thus, when there is an effective channel in both of the TV 5 and the VTRs connected thereto, the tuner portion 22 of the TV 5 is selected with priority, and the output of the tuner portion 22 is sent to and displayed on the CRT 8.

If a channel for a tuner which is not incorporated in the tuner portion 22 is selected, the CPU 12 looks up the tuner information table in the SRAM 21 to find a VTR incorporating a tuner adapted to this channel. Specifically, the CPU 12 uses the DRAM 20 as a counter, sequentially increments the count value therein by 1 and judges whether the selected channel is registered in the tuner information table corresponding to each count value as an effective channel or not (S17, S18 and S22).

Then, the CPU 12 transmits a switching control signal through the AV selector block control port 14 to the loop back processing portion 23 and the input switching portion 26 and, as a result, the selected VTR and the CRT 8 are connected (S19 and S20).

Further, the CPU 12 transmits a control signal from the control cable port 13 thereof through the control signal input/output processing portion 25 to the selected VTR to activate this VTR. In response to this, the VTR turns the power supply on, switches the channel and switches the output, thereby outputting the picture and voice signals of the relevant channel. The picture and voice signals are displayed on the CRT 8 through the loop back processing portion 23 and input switching portion 26 to complete the channel switching operation (S21).

3. Normal Recording and Recording of a Program on a Different Channel

Figure 10:
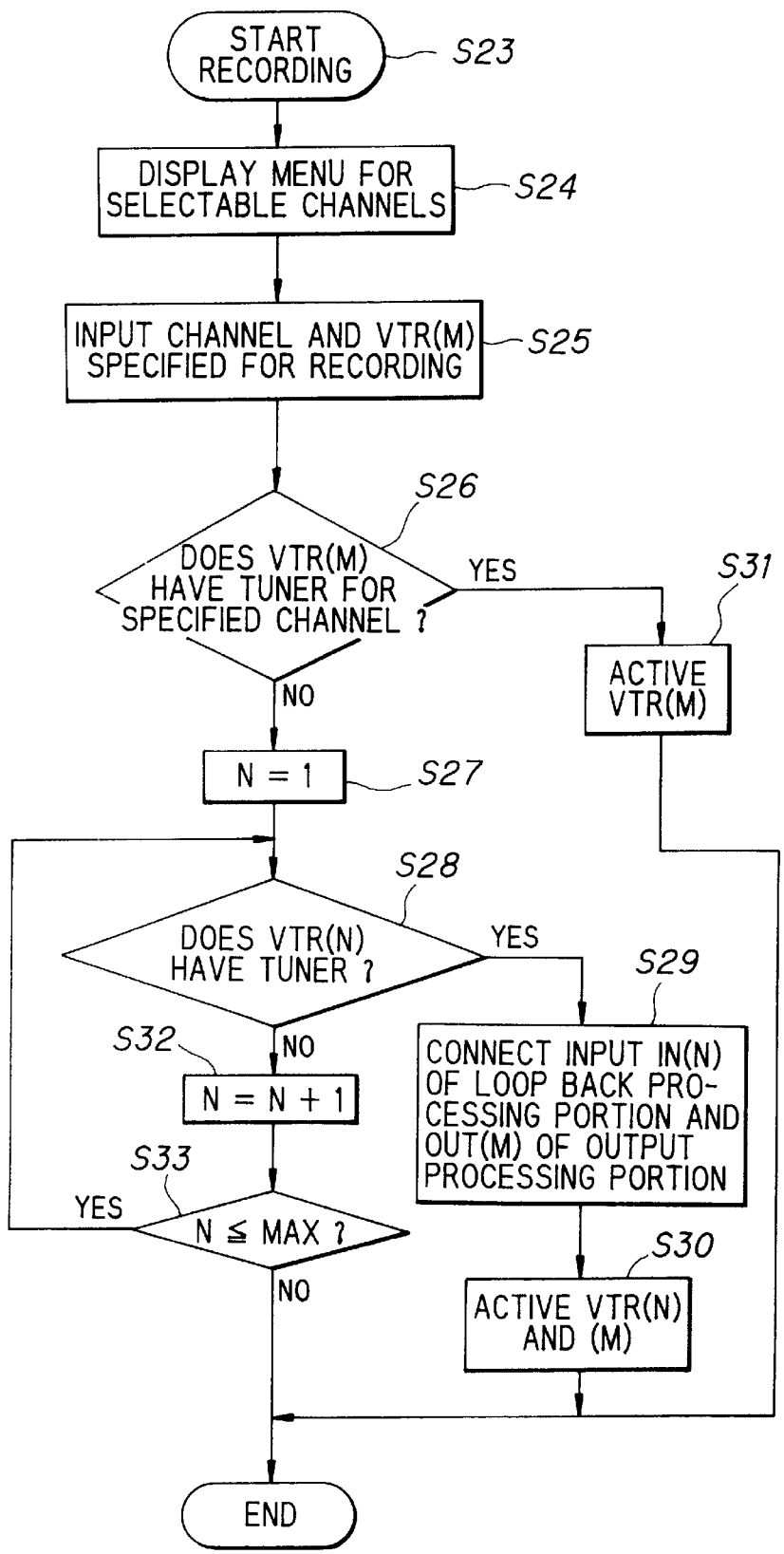
FIG. 10 is a flow chart illustrating a recording program in the same embodiment.

To perform normal recording and recording of a program on a different channel are performed, the user specifies "recording" using the remote controller 11 to cause the CPU 12 to start a recording program as shown in FIG. 10 (S23). If a time setting operation is performed using the timer, recording is automatically started at the set time. The CPU 12 first looks up the tuner information table in the SRAM 21 and displays only selectable channels in the form of a matrix on the CRT 8 as shown in FIG. 9.

Next, the CPU 12 accepts an instruction for recording a specified channel to a specified VTR or an instruction for recording a program on a different channel through the remote control receiving portion 10 (S25).

Thereafter, the CPU 12 judges whether the specified VTR has a tuner adapted to the specified channel or not based on the tuner information table in the SRAM 21 (S26). If yes, it activates the specified VTR to cause the incorporated tuner to receive the specified channel and starts recording (S31).

On the other hand, if the specified VTR does not incorporate a tuner adapted to the specified channel, the CPU 12 looks up the tuner information table in the SRAM 21 to find a VTR incorporating a tuner adapted to this channel. Specifically, the CPU 12 uses the DRAM 20 as a counter, sequentially increments the count value by 1 from 1 up to the (maximum) number of the VTRs connected, and judges whether the selected channel is registered in the tuner information table corresponding to each count value as an effective channel or not (S27, S28, S32 and S33).

When such a tuner is found, the CPU 12 transmits a control signal through the control cable port 13 to the loop back processing portion 23 and output processing portion 24 to control so that the input terminal of the specified VTR and the output terminal of the VTR thus found are connected by a video cable (S29).

Next, the CPU 12 transmits a control signal to the VTR incorporating the tuner through a control cable to activate it for reception of the specified channel and transmits a control signal to the VTR to perform recording to cause it to perform the operations of turning the power supply on, switching the input and then performing recording (S30).

Thus, a specified channel can be recorded by a VTR which does not have a tuner adapted to the specified channel or a VTR having no tuner such as a VTR integral with a camera. In the above description, when a specified VTR does not have a tuner adapted to a specified channel, recording is performed using a tuner of another VTR. Alternatively, such recording can be performed using the tuner portion 22 of the television set.

The television system according to the present invention can be embodied in other configurations wherein camera operations such as zooming are performed with pictures displayed on a VTR integral with a camera being monitored and wherein timed recording is performed from a double tuner television set to a VTR integral with a camera. With the above described configuration, a television system according to the present invention provides advantages as described bellow.

(1) In a television system including one or a plurality of VTRs connected to a television set in a predetermined manner, the selection of a channel in the system is performed using a tuner selected from among those incorporated in apparatuses in the television system. As a result, there are provided very excellent advantages as follows.

a. Centralized sharing of a tuner in an apparatus such as a VTR connected to the television set can be carried out at the television set regardless of the presence or absence of a tuner in each of the apparatuses.

b. This eliminates the need for tuners in the VTRs, resulting in a reduction in the cost of the VTRs.

c. The connection of video cables is simplified, and the need for input/output operations at the VTRs is eliminated.

(2) The selection of a tuner is performed using the tuner information table which is stored in the television set to provide very significant advantages as follows.

a. A broadcast on a channel can be easily recorded by, for example, a VTR incorporating no tuner such as a VTR integral with a camera or a VTR which does not incorporate a tuner adapted to the channel to be recorded.

b. A VTR integral with a camera which is rarely used in homes can be used in a manner similar to that for a stationary VTR.

c. It is possible to identify existing tuners connected to the system by systematically displaying them and to quickly select and extract information on channels which can be actually used.

(3) The tuner information table is created by performing mapping between tuners incorporated in apparatuses in the television system and information on channels which can be received by the tuners. This makes it possible to identify the connections of the channels by systematically displaying them and to easily create a table in which channels of tuners adapted to, for example, ground waves, communication satellites, broadcast satellites and the like are combined.

(4) Channel selection in this television system is performed using a channel selection screen created based on the tuner information table. This makes it possible to quickly, simply and accurately perform operations for watching and recording a broadcast using a tuner of a VTR in a manner similar to that for channel switching.

(5) The tuner incorporated in the television set is selected with priority over tuners in other apparatuses in the television system. If the television set does not have a desired channel, the desired channel is selected through a tuner having the channel. It is therefore possible to select the channel covered by the television set with priority to minimize frequency deviation during channel setting and to quickly and simply perform channel switching operations.

(6) A selected channel is recorded in a predetermined VTR in the television system and, when the predetermined VTR does not have a tuner capable of selecting the desired channel, recording is performed by connecting an apparatus having a tuner capable of selecting the desired channel in the television system. Therefore, if such a tuner is included in any apparatus in the system, recording can be performed by any other apparatus using the tuner.

(7) Since recording can be performed at a time preset using a timer, timed recording can be performed on a desired channel using even an apparatus which does not have the desired tuner.

(8) Channel selection is performed by means of remote control. The entire system can be operated using a single remote controller. This eliminates complications associated with operations on a plurality of remote controllers and helps keep the living space of the user in order.

While the present invention has been shown and described with reference to the foregoing preferred embodiment thereof, it will be apparent to those skilled in the art that changes in form and detail may be made therein without departing from the scope of the invention as defined in the appended claims.

What is claimed is:

1. A television system comprising at least one video apparatus and a television set, wherein the at least one video apparatus is connected to the television set via video cable over which picture and audio signals are transmitted and a control cable over which a control signal is transmitted, the at least one video apparatus operates according to the control signal transmitted by a television set connected thereto and wherein the television set includes:

an internal tuner;

a picture signal processing portion;

a storage means for storing receivable channel information of the internal tuner and receivable channel information of the tuners incorporated in the at least one video apparatus;

a channel selection means allowing a user to select a desired channel from a channel list displayed on a screen of the television set, the channel list including only receivable channels stored in the storage means;

a selection means for selecting a tuner, which is capable of receiving a selected channel, among the internal tuner and the tuners incorporated in the at least one video apparatus; and a supply means for supplying the control signal to the at least one video apparatus to tune the selected channel if the internal tuner is unable to receive the selected channel.

2. The television system according to claim 1, wherein the television set includes a means for determining receivable channels of the tuners incorporated in the at least one video apparatus and a means for registering the receivable channels of the internal tuner and the receivable channels of the tuners incorporated in the at least one video apparatus in the storage means.

3. The television system according to claim 1, wherein the channel selection is performed through remote control.

4. The television system according to claim 1 wherein the selection means gives priority to the internal tuner in selecting a tuner.

5. The television system according to claim 1, wherein at least one of the at least one video apparatus is a VTR which records the selected channel.

6. The television system according to claim 5, wherein the recording is performed at a time preset using a timer.

7. A television set which can be connected to at least one video apparatus via video cable over which picture and audio signals are transmitted and a control cable over which a control signal is transmitted, the at least one video apparatus operates according to the control signal transmitted by a television set connected thereto, the television set comprising:

an internal tuner;

a picture signal processing portion;

a storage means for storing receivable channel information of the internal tuner and receivable channel information of the tuners incorporated in the at least one video apparatus;

a channel selection means for allowing a user to select a desired channel from a channel list displayed on a screen of the television set, the channel list including only receivable channels stored in the storage means;

a selection means for selecting a tuner, which is capable of receiving a selected channel, among the internal tuner and the tuners incorporated in the at least one video apparatus; and a supply means for supplying the control signal to the at least one video apparatus to tune the selected channel if the internal tuner is unable to receive the selected channel.

8. The television set according to claim 7 further comprising a means for determining the receivable channels of the tuners incorporated in the at least one video apparatus and a means for registering the receivable channels of the internal tuner and the receivable channels of the tuners incorporated in the at least one video apparatus in the storage means.

9. The television set according to claim 7, wherein the channel selection is performed through remote control.

10. The television set according to claim 7, wherein the selection means gives priority to the internal tuner in selecting a tuner.

11. The television set according to claim 7 wherein if the internal tuner is unable to receive the selected channel, the television set activates any one of the at least one video apparatus which has a tuner capable of receiving the selected channel to receive the selected channel through the activated video apparatus.

12. The television system according to claim 1, wherein the television system includes a plurality of video apparatuses.

13. The television system to claim 12, wherein each of the plurality of video apparatuses is directly connected to the television set.

14. The television system according to claim 12, wherein:

at least one of plurality of video apparatuses connected is a VTR which records the selected channel; and if the VTR does not have a tuner capable of receiving said selected channel, said supply means connects the output of one of the plurality of video apparatuses which has a tuner capable of receiving said selected channel to the input of the VTR.

15. A method of selecting channels in a television system comprising at least one video apparatus and a television set, wherein the at least one video apparatus is connected to the television set via video cable over which picture and audio signals are transmitted and a control cable over which a control signal is transmitted, the at least one video apparatus operates according to the control signal transmitted by a television set connected thereto and wherein the television set includes an internal tuner, a picture signal processing portion, a storage means, a channel selection means, a tuner selection means, and a supply means, the method comprising the steps of:

storing, in the storage means, receivable channel information of the internal tuner and receivable channel information of the tuners incorporated in the at least one video apparatus;

allowing a user to select a desired channel, by the channel selection means, from a channel list displayed on a screen of the television set, the channel list including only receivable channels stored in the storage means;

selecting a tuner, by the tuner selection means, which is capable of receiving a selected channel, among the internal tuner and the tuners incorporated in the at least one video apparatus; and supplying, by the supply means, the control signal to the at least one video apparatus to tune the selected channel if the internal tuner is unable to receive the selected channel.

* * * * *